April 5, 1932.  J. KAMINSKI  1,852,580
TONGS FOR PLACING KEEPERS ON VALVE STEMS
Filed Oct. 6, 1930
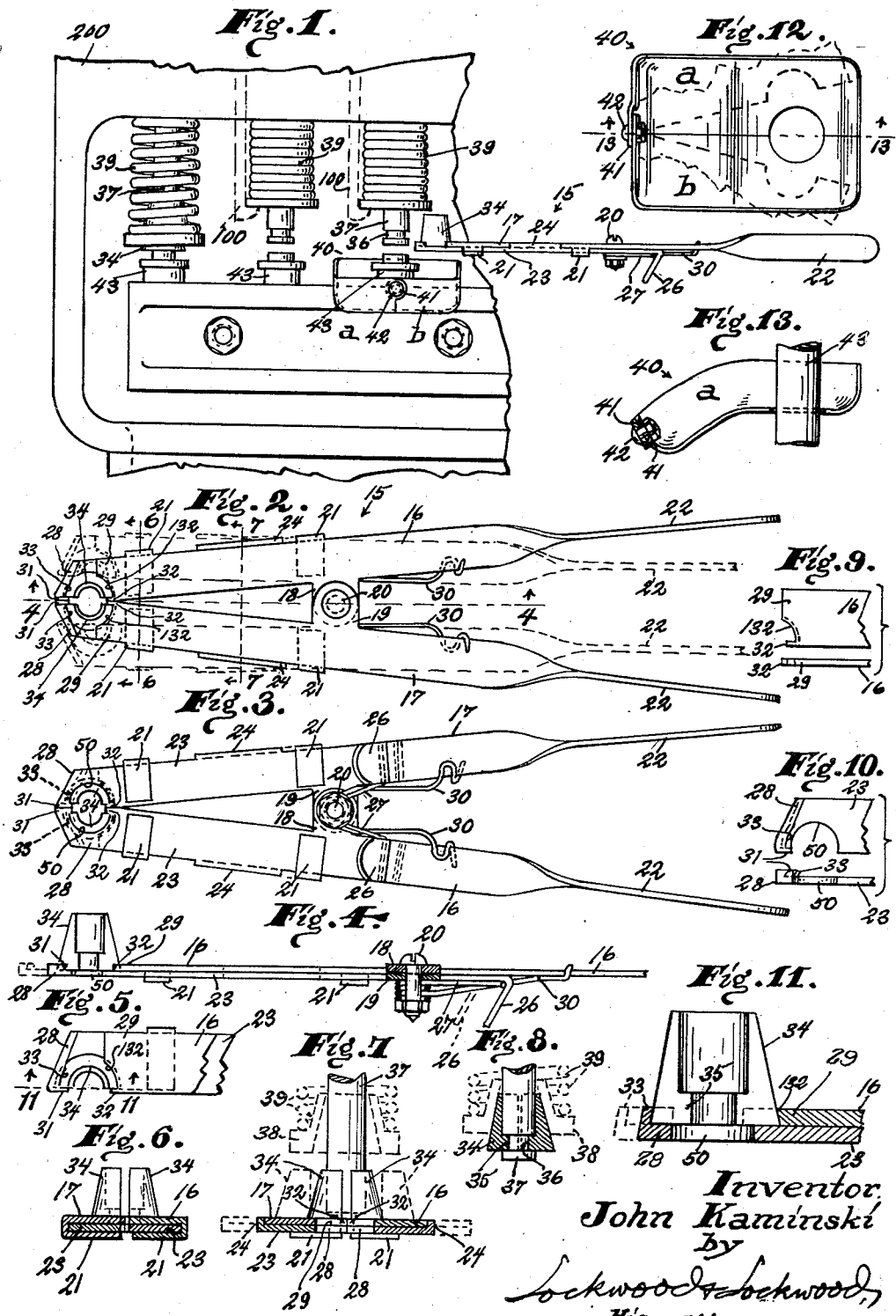
Inventor
John Kaminski
by
Lockwood & Lockwood,
His Attorneys.

Patented Apr. 5, 1932

1,852,580

UNITED STATES PATENT OFFICE

JOHN KAMINSKI, OF PASADENA, CALIFORNIA

TONGS FOR PLACING KEEPERS ON VALVE STEMS

Application filed October 6, 1930. Serial No. 486,531.

This invention relates to appliances for placing cone-shaped split keepers on valve stems to support their retainer disks in position to hold the valve springs under tension and to prevent loss of the keeper parts while being placed in use, and, as is well known, the placing of these keepers on valve stems has heretofore been considered a tedious difficult task requiring both time and labor to accomplish, and the principal object of this invention is to save time and labor in seating the keepers by providing a keeper tongs that will aid greatly in connecting the keeper to a valve stem without loss of time or arduous and tedious labor. To that end I provide a keeper tongs adapted to grip and hold the base edges of the keeper parts so they can be separated by manipulation of the tongs a sufficient distance to extend them up and over the lower end of a valve stem into a seating position. In other words the halves of the keepers are detachably secured to the arms of the tongs so they can be easily handled while being moved into place on the valve stem.

Another object of the invention is to provide a simple means for preventing the parts of the cone shaped keeper from being lost or displaced from the tongs while being placed in use, and to that end I provide the tongs with jaws at an end of each arm having teeth arranged around a keeper seat that are adapted to engage and hold the halves of the keeper so they cannot easily be displaced from the tongs even when roughly handled. In other words the teeth of the jaws grip the base of the cone shaped keeper so firmly that the tongs can be turned upside down and thrown around roughly without displacing its parts, yet the firm gripping of the jaws on the keeper parts does not prevent an easy separation of the tongs from the keeper when the latter is properly seated on a valve stem.

Another object of the invention is to provide a means for preventing the keeper halves from falling into the engine crank case if inadvertently they are displaced from the tongs or from the valve stem while being placed in use, or disconnected from the stem, and to that end I provide a keeper catch pan that in the operation of placing the keeper on or removing it from the valve stem is a companion part with the tongs in saving time and labor. In use it is adapted to be fitted around the valve stem push rod so it is under the keeper and arranged to catch its parts if they fall toward the crank case either while being placed on or removed from the valve stem.

Features of invention are shown in the construction, combination and arrangement of the parts whereby a keeper tongs and catch pan are provided that are adapted to save time and labor in attaching and detaching the keeper parts to and from a valve stem, which appliances are also easy to construct, assemble and operate, and durable in use.

Other objects, advantages and features of invention may appear from the accompanying drawings, the subjoined detailed description and the appended claims.

The accompanying drawings illustrate the invention, in which:

Fig. 1 is a semi-diagrammatic side view of an engine showing the keeper tongs and catch pan in use, the tongs being shown in side elevation and in a position to attach a keeper to a valve stem; and the pan is arranged to catch the halves of the keeper in the event they are accidentally displaced from the tongs while being placed in use. Fig. 2 is a plan view of the tongs showing a keeper connected to it; also indicating by dotted lines an open position of the tongs. Fig. 3 is a view from the underside of the tongs. Fig. 4 is a slightly enlarged sectional view on the line 4—4, Fig. 2, showing a half part of a keeper with its base portion secured to the tongs and also showing by dotted lines the lower slide bar moved to an open position so the half part of the keeper can be released from or seated on the tongs. Fig. 5 is a plan view of the left hand portion of Fig. 4, showing the arrangement of the teeth on one of the movable jaws for gripping the half portion of the keeper. Fig. 6 is a cross section on line 6—6, Fig. 2, showing the tongues on the tong arms extended under the slide bars to aid in holding those parts together, also showing about the normal position of the half parts of the keeper when seated on the tongs. Fig. 7 is another cross section on the line 7—7 of Fig. 2 showing the side flanges on the slide bars that engage the edges of the arms to keep those parts together, also illustrating by dotted lines the position of the half parts of the keeper before being placed on the valve stem and by full lines showing them arranged on the valve stem ready to receive the valve spring retainer that is shown by dotted lines above the keeper.

Fig. 8 is a view analogous to Fig. 7 showing the keeper fully seated on the valve stem and the tongs removed; and also showing by dotted lines the spring retainer seated on the keeper. Fig. 9 is a fragmental combined plan and edge view of the jaw end of one of the arms and the teeth for engaging the keeper. Fig. 10 is also a fragmental combined plan and edge view of the jaw end of one of the slide bars or companion part to the parts shown in Fig. 9, showing the teeth for engaging the keeper. Fig. 11 is a greatly enlarged section on the line 11—11 of Fig. 5, showing a half part of a keeper seated on the slide bar and gripped by the inclined curved teeth of the fixed and movable jaws.

Fig. 12 is a top plan of the keeper catch pan.

Fig. 13 is a section through line 13—13 of Fig. 12.

The tongs 15 includes the arms 16 and 17 that have overlapping side flanges 18, 19 that are connected by a pivot bolt 20. The arms and integral side flanges as well as the tongues 21 are stamped out of suitable sheet metal and preferably the handle ends 22 of these arms are given a quarter turn so they are arranged at right angles relative to the arms.

The tongues 21 which also are integral with the arms are bent downward and then under the arms so as to hold the slide bars 23 with their integral flanges 24 engaged with the outside edges of the arms so they are slidable between the tongues. The bars 23 have turned down projections 26 at their rear ends by which the bars are manually moved against the tension of a spring 27. This spring normally moves the jaws 28 of the slide bars toward the jaws 29 on the arms 16, 17, and the projections form finger holds for manually separating the jaws so the half parts of a keeper can be attached to or detached from the tongs. Normally the spring 27 holds the side flanges 24 of the bars 23 engaged with the rear tongues 21 of the arms as indicated by dotted lines in Fig. 3.

Another spring 30 is arranged on the pivot bolt 20 for normally forcing the handles 22 apart so that the side teeth 32 of the jaws 29 engage one another and also side teeth 31 of the jaws 28 on the slide bars abuttingly engage, as best shown in Figs. 2 and 3.

In addition to the side teeth 31 the movable jaws 28 are provided with inclined curved end teeth 33 that are arranged to fit over the curved base edge portion of the split cone-shaped keeper 34 and by means of the spring 27 the teeth 23 are actuated to force the halves of the keeper against the side teeth 32 and also the curved inclined end teeth 132 of the jaw 28 so the keeper is very firmly secured to the tongs so the latter can be handled relatively roughly without displacing the parts of the keeper.

Also the parts of the keeper are secured to the jaws so the tongs can be manipulated to separate them a sufficient distance to place them on a valve stem, as previously stated.

The keeper 34, as is well known, is a hollow split tapered cone plug having an inwardly extended annular flange 35 that is seated in an annular recess 36 on the lower end of a valve stem 37 so as to support the retainer disk 38 in a position to hold the valve spring 39 under tension. These parts are all old and are only shown in the drawings for the purpose of illustrating the use of the tongs and catch pan.

The slide bars 23 are cut away at 50 to form a clearance for the lower end of the valve stem 37 when the keeper is moved into place, see Figs. 3, 4 and 10.

The keeper catch pan 40 is split centrally through its bottom and ends, and at one of its ends are overlapping bearing extensions 41 that are pivotally connected by the bolt 42 so that the parts $a$ and $b$ of the pan can be separated so as to fit the pan around the valve push rods 43. The open position of the pan is partly indicated by dotted lines in Fig. 12; and in Fig. 1 it is shown in use. Preferably the front or pivoted end of the pan is bent down as best shown in Fig. 13 so that it will not be in the way of the keeper tongs when placing a keeper on a valve stem.

The pan is easily attached and detached from and to the push rods and is very effective in catching the parts of the keeper in the event they are displaced from the tongs while being placed on the valve stem; and also when these keepers are removed from the stem for any purpose the pan will prevent them from falling into the crank case in the event they fall out of the mechanic's hand when the valve spring retainer is lifted against the tension of the valve spring 39.

The engine 200 is fragmentally shown in Fig. 1, it being understood that the tongue and catch pan can be used to install and change the keepers on all types of engines using them.

In Fig. 1 I show the left hand spring 37 and associated parts in about a normal position, the other two springs 37 to the right of it being lifted or elevated so that the keepers 34 can be attached to the valve stems 37.

The means for lifting the springs 37 to release the keepers or place them on the valve stems is old in the art and form no part of this invention, however a tool 100 indicated by dotted lines in Fig. 1 is shown for the purpose of illustration.

In operation the spring 37 is lifted by the tool 100 and held in an elevated position while the keeper 34 is removed and replaced for purposes well known in the art, such as removing the valves for grinding and replacing them.

When the keeper 34 is to be placed on the valve stem its halves are seated on the tongs with their base edges gripped by the jaws 28 and 29. Then the tongs are manipulated to place the keeper on the valve stem so its annular flange 35 is seated in the annular groove 36 in the stem where the keeper is held until the tool 100 is operated to release the spring 37 the tension of which will force the retainer 38 down over the tapered keeper and hold it securely on the stem; and also the keeper in turn will hold the retainer in position to support the spring 37 under proper tension.

Also as the retainer descends on the keeper it will strike the upwardly extending teeth on the jaws 28, 29 and automatically displace the tongs from the keeper. It is understood, however, that the slide bars 23 can be moved by means heretofore described to release the tongs from the keeper when so desired.

I claim as my invention:

1. A keeper tongs including a pair of arms having overlapping side extensions, a bolt pivotally connecting said extensions, handles on said arms, slide bars supported under said arms, projections to said bars arranged adjacent said handles, a spring on said bolt for engaging said projections and normally forcing said bars toward said handles, and jaws at the ends of said arms and bars for engaging and detachably holding a keeper so it can be placed on a valve stem.

2. A keeper tongs including a pair of arms having overlapping side extensions, a bolt for pivotally connecting said extensions so the ends of said arms can be moved toward and from one another, handles to said arms, slide bars arranged under said arms, tongues and side flanges for slidably connecting said bars to said arms, projections to said bars arranged adjacent said handles, a spring for engaging said projections and normally forcing said bars toward said handles, and jaws at the ends of said arms and bars arranged to engage and hold the base edge portion of a keeper so it can be secured to a valve stem.

3. A keeper tongs including a pair of arms having overlapping side extensions, a bolt pivotally connecting said extensions so the ends of said arms can be moved toward or from one another, handles integral with said arms, slide bars arranged under said arms, tongues integral with said arms and edge flanges integral with said bars for slidably holding said bars under said arms, projections that can be manually manipulated to move said bars endwise of said arms, a spring on said bolt for engaging said projections and normally forcing said bars endwise toward said handles, another spring on said bolt for normally forcing said handles apart, and jaws at the ends of said arms and bars for engaging and holding a keeper so it can be placed on a valve stem.

4. A keeper tongs including a pair of arms having overlapping side extensions, a bolt pivotally connecting said extensions so the ends of said arms can be moved toward or from one another, handles integral with said arms, slide bars arranged under said arms, tongues integral with said arms and edge flanges integral with said bars for slidably holding said bars under said arms, projections that can be manually manipulated to move said bars endwise of said arms, a spring on said bolt for engaging said projections and normally forcing said bars endwise toward said handles, another spring on said bolt for normally forcing said handles apart, jaws at the ends of said arms and bars, and teeth on said jaws for engaging and holding a keeper so it can be placed on a valve stem.

5. A keeper tongs including arms, overlapping side extensions integral with said arms, a bolt extending through said side extensions for pivotally securing said arms together, jaws integral with said arms, side teeth integral with said jaws, handles on said arms, bars slidably connected to said arms, jaws on said bars, a spring for normally forcing the jaws on said bars toward the jaws on said arms, side teeth on the jaws of said slide bars arranged to be moved longitudinally toward or away from the side teeth on the jaws of said arms, and curved inclined end teeth to the jaws of said slide bars adapted to be fitted over and around the base edge portion of a split conical keeper.

In witness whereof, I have hereunto affixed my signature.

JOHN KAMINSKI.